Aug. 19, 1958 F. H. McLAUGHLIN ET AL 2,848,524
ARC MELTING APPARATUS
Filed Oct. 15, 1956 5 Sheets-Sheet 1

INVENTORS
Joseph L. Mangin
Frank H. Mc Laughlin
BY
AGENT

INVENTORS.
Joseph L. Mangin
Frank H. McLaughlin

AGENT

Aug. 19, 1958  F. H. McLAUGHLIN ET AL  2,848,524
ARC MELTING APPARATUS

Filed Oct. 15, 1956  5 Sheets-Sheet 3

INVENTORS.
Joseph L. Mangin
Frank H. McLaughlin
BY
AGENT

Aug. 19, 1958  F. H. McLAUGHLIN ET AL  2,848,524
ARC MELTING APPARATUS

Filed Oct. 15, 1956  5 Sheets-Sheet 4

INVENTORS.
Joseph L. Mangin
Frank H. McLaughlin
BY

AGENT

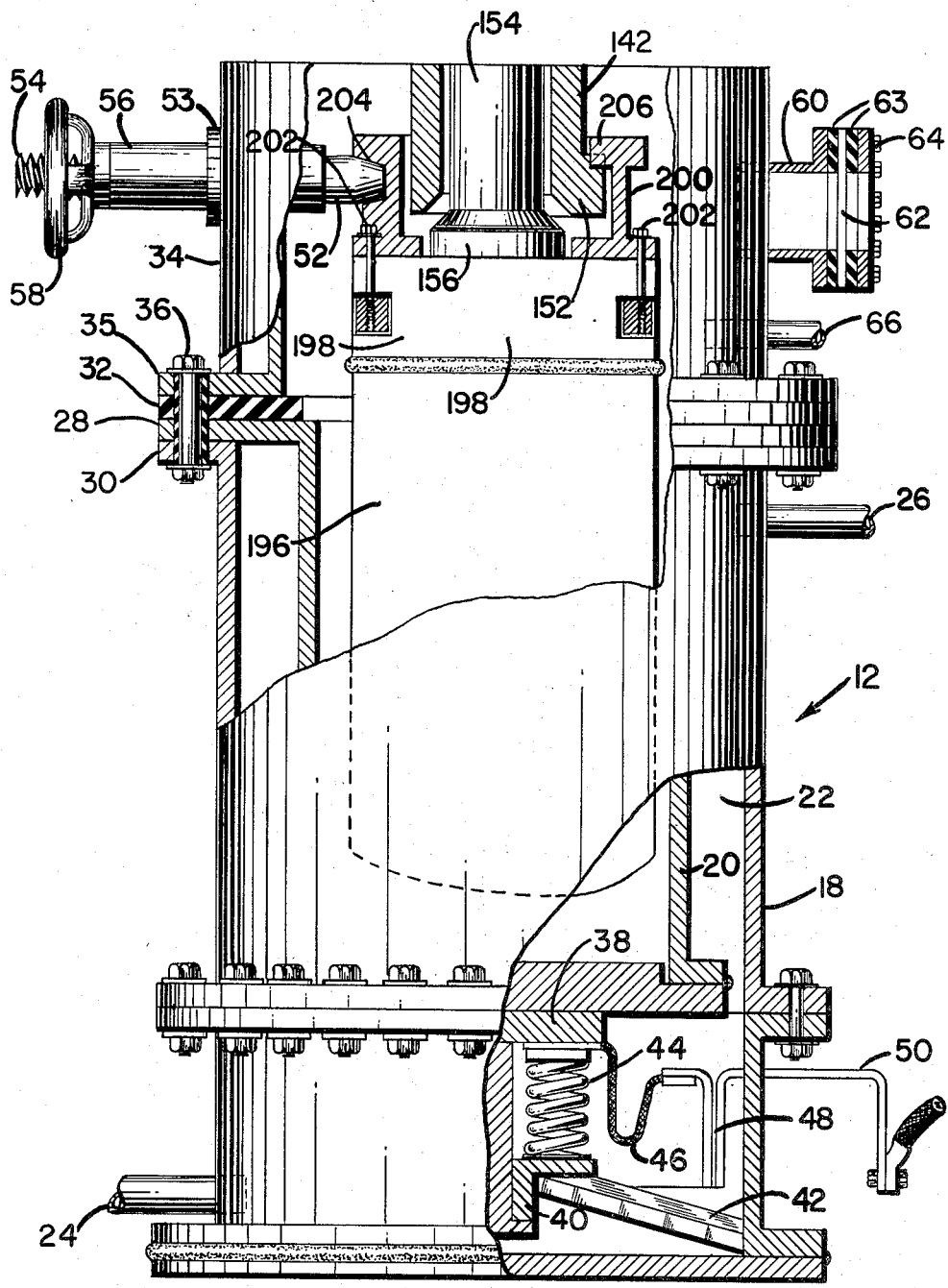

United States Patent Office 2,848,524
Patented Aug. 19, 1958

2,848,524

ARC MELTING APPARATUS

Frank H. McLaughlin and Joseph L. Mangin, Las Vegas, Nev., assignors to Titanium Metals Corporation of America, New York, N. Y., a corporation of Delaware Application October 15, 1956, Serial No. 615,927

5 Claims. (Cl. 13—31)

This invention relates to improvements in apparatus for arc melting. More particularly it relates to an improved consumable electrode arc furnace for melting such metals.

Furnaces heretofore designed and operated for melting, for example steel, titanium or zirconium, into ingots have been generally bulky, complicated and incapable of rapid production. Since such metals are reactive with atmospheric gases, at elevated temperatures, melting furnaces must be enclosed and the melting carried out under an inert atmosphere, such as argon or helium, or in vacuo. After melting into an ingot the metal must remain in the furnace for a period of time until it has been cooled to a temperature at which it may be safely exposed to the air. The cooling period may be as long as the time required to melt the ingot. When the ingot is cool the furnace must be at least partially dismantled, the ingot and electrode stub removed, and a new electrode set in place before another melt cycle can be started.

It is therefore a principal object of this invention to provide improved apparatus for arc melting metals. A further object of this invention is to provide apparatus for melting metals into ingots in shorter periods of time than has been possible heretofore. Still another object of this invention is to provide an apparatus for melting metals in which the consumable electrode handling and control mechanism is adapted to serve a plurality of individual furnace units. These and other objects of this invention will be apparent from the following description thereof and from the annexed drawings in which:

Fig. 5 is an enlarged side view partly broken out of the lower portion of the apparatus.

Figure 1:
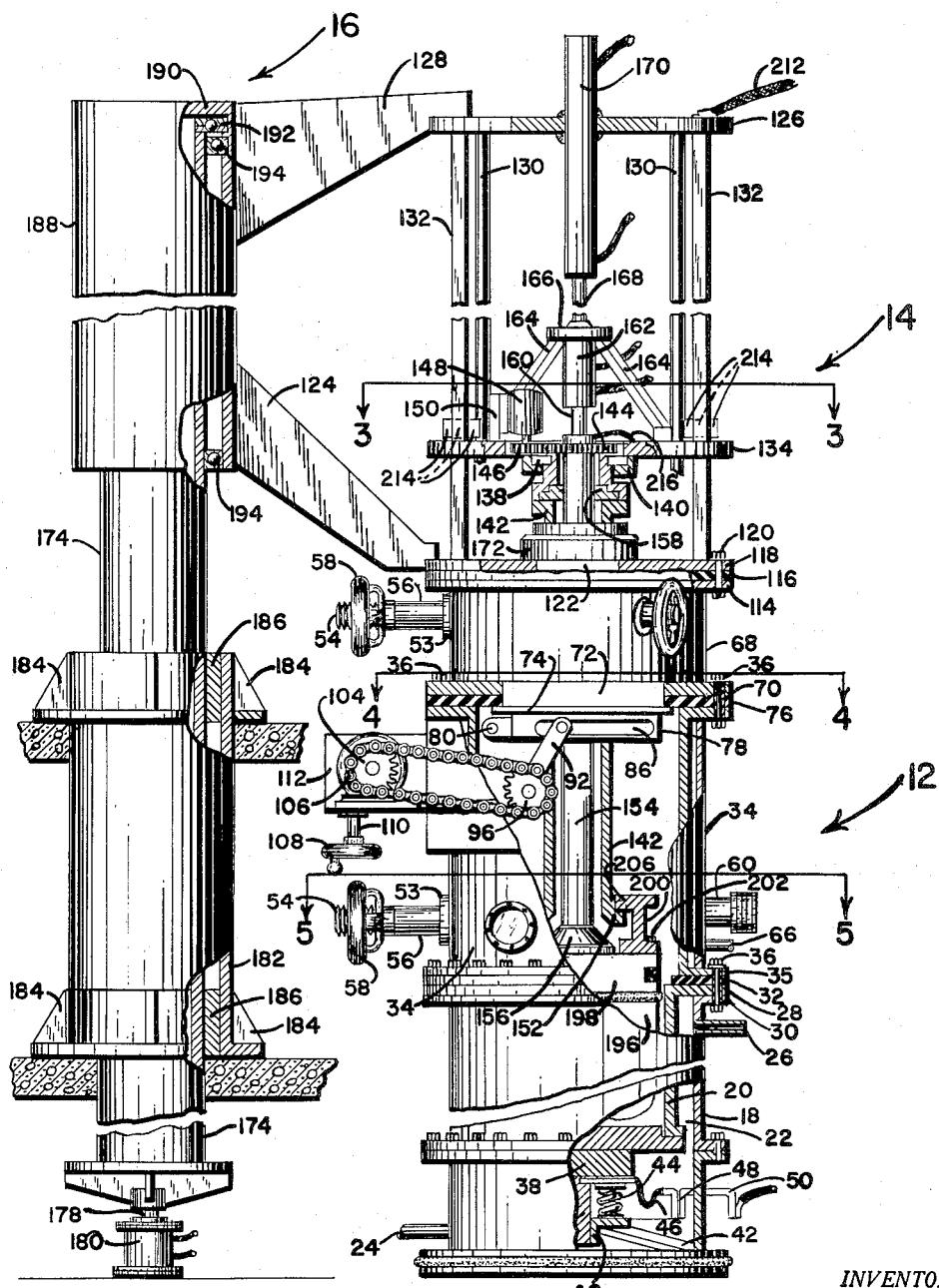
Fig. 1 is a general side view, partly broken out, of apparatus embodying features of this invention.

In Fig. 1 apparatus embodying features of this invention is shown assembled with one of the furnace units. The apparatus may, for convenience in description, be separated into three component parts. The furnace unit proper is indicated generally at 12, the electrode drive mechanism at 14 and the electrode drive positioning apparatus at 16.

Figure 2:
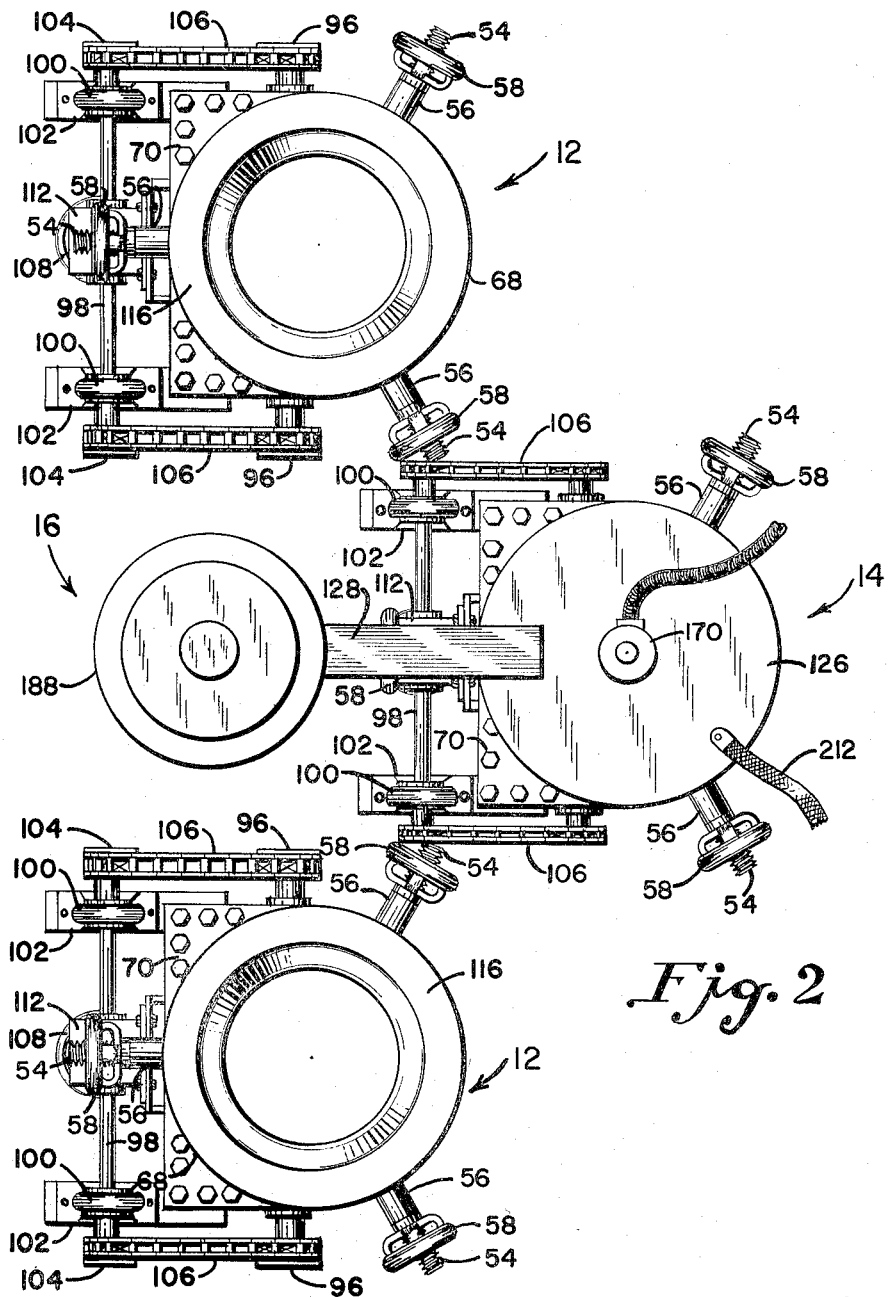
Fig. 2 is a general plan view of the apparatus of Fig. 1 showing the relationship of the electrode handling mechanism and a plurality of furnace units.
Figure 3:
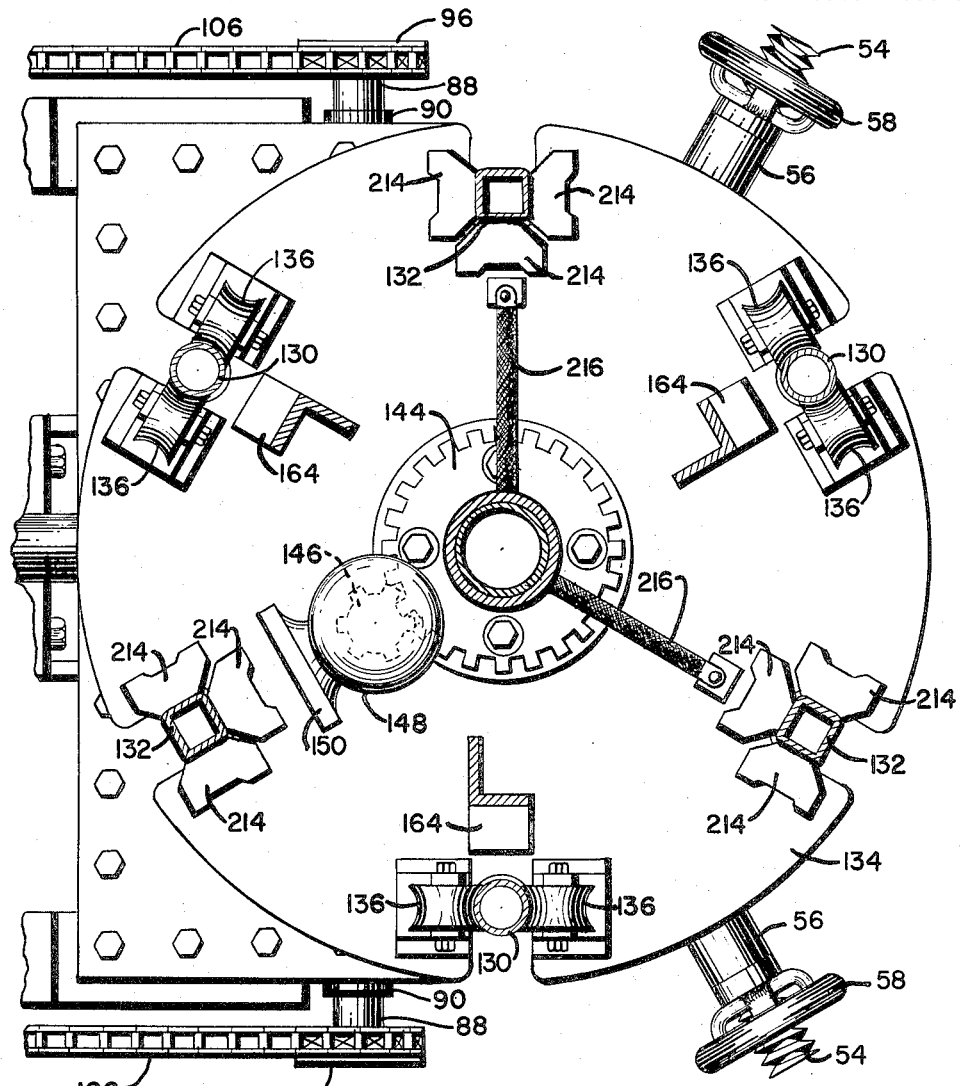
Fig. 3 is a horizontal section of the apparatus of Fig. 1 taken along the line 3—3.

As will be apparent from Fig. 2, a number of furnace units 12 are arranged on an arc of a circle surrounding the electrode drive positioning apparatus 16. This allows the electrode drive mechanism 14 to be swung and mounted in operative engagement with each furnace selectively as will hereinafter be explained in detail.

The furnace unit 12 is composed of an outer shell 18 within which is contained a cooled crucible 20. The space between the outer wall 18 and crucible 20 forms cooling jacket 22 for which a supply of water may be introduced through inlet 24 and exhausted through outlet 26. The crucible is preferably fabricated of copper and is provided at its top surface with outwardly extending flange 28 which overlays a corresponding flange 30 at the top of a section of the furnace wall 18. Above flange 28 is an insulating ring 32 above which is positioned lower throat chamber 34, which is also preferably of cooled wall construction and which is provided at its bottom with a flange 35 similar to 28 and 30. The flanges and the insulating ring in position are fixedly fastened together as by insulated bolts 36. Since the crucible 20 and its contained metal serves as one electrode, a suitable electrical connection thereto is provided by block 38 which rides vertically in ring 40, which in turn is supported from the side of the furnace by arms 42. The block 38 is urged upwardly into close and good electrical contact with the bottom of crucible 20 by springs 44. Flexible cables 46 connect block 38 with a collector ring 48 from which connector 50 passes through the furnace wall and is externally connected to a suitable power source, not shown.

In the lower throat section 34 of the furnace as will be apparent from Fig. 5, are provided means for releasably suspending an electrode holder which in the embodiment described comprise a series of internally projecting pins 52. These pins pass through suitable glands 53 in the throat wall and externally thereof are threaded as at 54 and extend out through casings 56. Rotatably attached to the ends of the casings and threaded on the pins at 54 are hand wheels 58. Adjustment of pins 52 is obtained by rotation of the hand wheels 58 which moves them radially inwardly and outwardly. In the vicinity of these pin assemblies, and preferably intermediate of them around the circumference of the furnace, are provided peep holes which comprise short section of tubing 60 open at their inner ends and provided with flanges externally of the furnace. Sight glasses 62 are protected and sealed by gaskets 63 and maintained firmly in place by bolted-on closure rings 64. A pipe outlet 66 is also provided through the wall of the lower throat section of the furnace to enable inert gases to be introduced and withdrawn from the interior of the furnace, or to provide a connection to a vacuum pumping system if the furnace is to be operated at subatmospheric pressure. On the top of the lower throat section of the furnace is provided upper throat section 68, which is provided with an additional set of pin assemblies and peep holes identical in construction and operation to those in the lower throat section and for ready reference and identification have been numbered similarly. The bottom of throat section 68 is attached to horizontal plate 70 in which is centrally located port 72.

Figure 4:
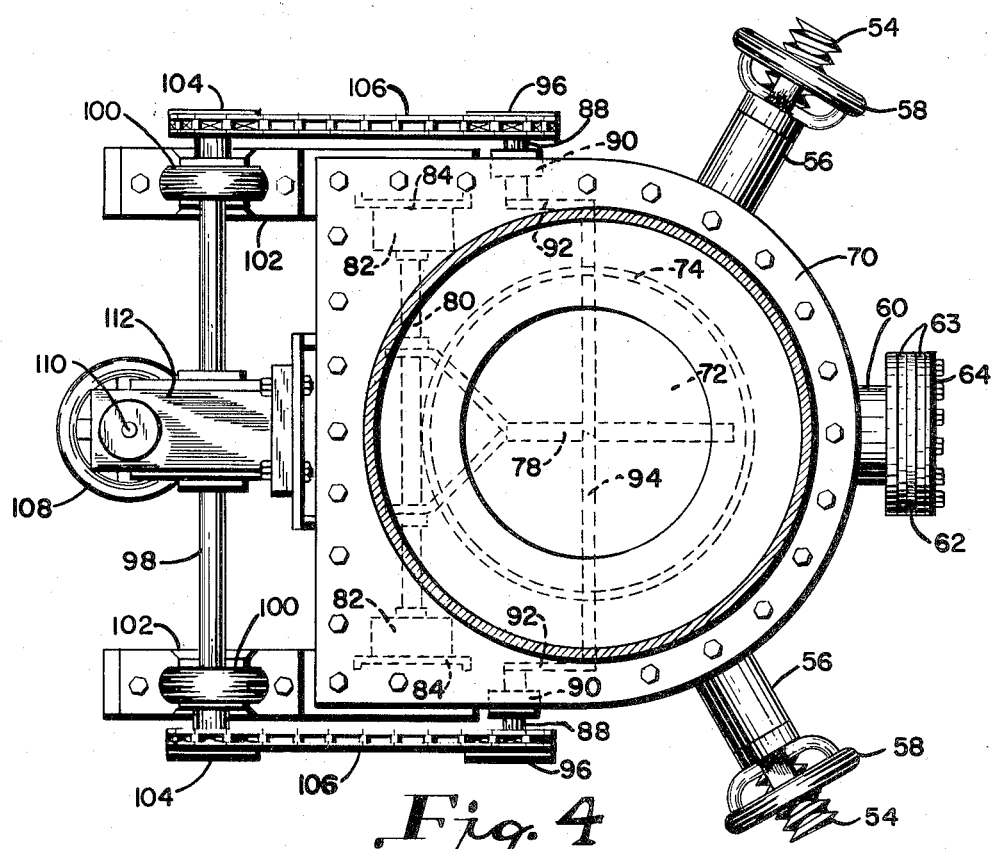
Fig. 4 is a horizontal section of the apparatus of Fig. 1 taken along the line 4—4.

As is shown in Figs. 1 and 4, the port 72, which is thus spaced from the top of the furnace proper, may be closed and the furnace unit sealed at desired times during the operating cycle by flap gate 74. A sealing ring 76 is affixed to the under surface of plate 70 around the outside of the port 72 to provide a gas tight seal when gate 74 is firmly maintained in its closed position and also to serve as a gasket between the upper flange of lower throat section 34 and plate 70. Y-brace member 78 is attached to hinge shaft 80, which is maintained in horizontal rotatable position by end bearings 82 which are supported from the throat section sidewall as by brackets 84. The body portion of brace member 78 is relatively deep to provide substantial rigidity to the gate 74 and is provided with a longitudinal extending slot 86. Transfixing the throat section wall at points spaced below the plate 70 are pins 88 which ride through sealing bushings 90. At their inner ends are fixedly attached bell crank levers 92, which at their free ends are connected by cross shaft 94 which rides in the slot 86 in bracing member 78. The outer ends of pins 88 are provided with fixedly attached sprockets 96. Drive shaft 98 is horizontally mounted as by bearings 100 on brackets 102 which are attached conveniently to the outside throat wall and carries at its outer ends sprockets 104, which are connected to sprockets 96 by driving chain 106. The drive shaft 98 is actuated by rotation of hand wheel 108 on jack shaft 110, operating through a conventional worm gear drive box 112.

The electrode drive mechanism 14 is arranged to be detachably mounted on the top of upper throat section 68 of the furnace unit 12. The top of section 68 terminates in horizontal flange 114 and on top of this is placed an insulating ring or gasket 116. These are attached to the bottom plate 118 of the electrode drive mechanism conveniently by insulated bolts 120. Centrally in plate 118 is provided an opening 122. The bottom plate 118 is fixedly attached to lower angle support member 124 and head plate 126, which is spaced apart from the plate 118 below, is similarly attached to angle brace member 128. Between head plate 126 and bottom plate 118 are provided guide members 130. There are preferably three of these guide members equally spaced, and intermediate between these guide members are bus bar connecting members 132 which in addition to carrying electrical current also serve as additional guiding members for guide plate 134 through which they pass. Rollers 136, rotatably attached to guide plate 134 and riding against guide members 130 provide accurate alignment of the guide plate 134 in its travel up and down the guide members and bus bar guides. Rotatably supported and depending from guide plate 134 as by seal bearing 138 and collar 140 is the electrode ram, in the form of tube 142.

At the upper end of ram 142 is fixed horizontally mounted gear wheel 144 and meshing therewith is pinion 146 driven by electric motor 148. The motor 148 is conveniently mounted in vertical position by base 150 which is fixedly attached to guide plate 134. It will be apparent that the motor 148 acts through gears 146 and 144 to rotate the ram tube 142 about its vertical axis.

The bottom of ram tube 142 is provided as is shown more clearly in Fig. 6, with a plurality of outwardly extending ears 152, whose function and coaction with other parts of the apparatus, will be explained hereinafter in more detail.

Centrally inside ram tube 142 is disposed push rod 154 whose bottom is provided with mushroom foot 156. Push rod 154 passes upwardly through ram tube 142 and at a point in the upper section thereof passes through sliding seal 158. The top of rod 154 slidably transfixes gear 144 and is connected to the bottom of piston rod 160 which in turn is attached to the piston (not shown) in hydraulic cylinder 162. It will be seen that the push rod 154 may be activated up and down with respect to the ram tube 142 by the action of the hydraulic cylinder 162 and that this vertical motion is independent of the rotating motion which can be imparted to ram tube 142 by motor 148.

Extending upwardly and inwardly from guide plate 134 are brace struts 164 which at their tops are fixedly attached to sub-plate 166. To the bottom of sub-plate 166 is fixedly attached the upper end of hydraulic cylinder 162 and to its upper surface is attached the piston rod 168 from hydraulic cylinder 170. This cylinder is itself attached to head plate 126 and conveniently because of its length passes through head plate 126 and extends in part above it. It will be seen that the whole ram tube assembly including the internal push rod may be raised and lowered vertically by action of hydraulic cylinder 170, the assembly being aligned by the provision of guide plate 134 riding up and down on guide members 130 and bus bar members 132 and where the ram tube passes through plate 118 by provision of sliding seal 172.

As has been mentioned hereinbefore the electrode drive mechanism 14 as a unit is detachably mounted on furnace unit 12 so that it may serve a plurality of such furnace units as is shown more clearly in Fig. 2. Positioning means 16 are provided for handling the drive unit 14, which, in the embodiment illustrated, comprise, a vertical post 174 which is provided with a heavy base plate which is fixedly attached to and supported by piston rod 178 of hydraulic cylinder 180. Post 174 is maintained vertical by provision of aligning sleeve 182 which is rigidly poistioned as by web angles 184 which are firmly anchored to intermediate floors or other bracing structures. Post 174 is slidable vertically in sleeve 182 being maintained vertically therein by bearing bushings 186. Upper sleeve 188 surrounds the top portion of post 174 and is provided with cap plate 190 which rides on top of post 174 on thrust bearing 192. Sleeve 188 is rotatably aligned around post 174 by provision of radial bearings 194. The top of sleeve 188 is fixedly connected to brace member 128 and the bottom thereof to brace number 124 thereby to support the drive mechanism 14. It will be seen that by removing bolts 120 the bottom plate 118 of the drive mechanism may be disconnected from the insulating ring 116 at the top of any furnace unit. The drive unit may then be detached and lifted up by action of hydraulic cylinder 180, which lifts post 174, its upper sleeve 188 and the drive unit attached thereto, and swung over and mounted in operative engagement with another of the furnace units 12.

Figure 6:
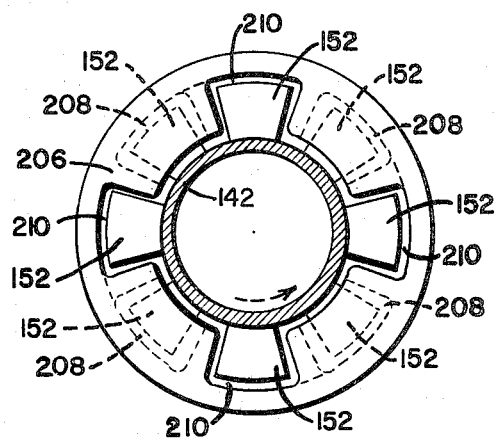
Fig. 6 is a more detailed top view of the mechanism for locking an electrode into the electrode holder.

The details of the design for attachment of an electrode to be melted to ram 142 will be more clearly seen in Figs. 5 and 6. An electrode 196 is attached, as by welding, to contact plate 198 which is in turn demountably attached to the base of an electrode holder 200 as by sunken head bolts 202.

Holder 200 is provided in its outer sidewall with internally extending sockets 204 adapted to mate with the ends of pins 52 when these are in internally extended position. Thus the electrode may be temporarily supported on pins 52 at either the upper or lower position in the furnace where the two sets of pins are located.

Holder 200 additionally is provided with in-turned upper flange 206 which is provided on its lower surface with a series of radial cavities 208 adapted to mate with ears 152 on the lower end of ram tube 142 and a series of interspaced radial cutout portions 210 of size somewhat larger than ears 152. It will be seen that an electrode suspended by pins 52 engaging holder 200, may be detachably locked to the ram by first lowering the ram assembly by means of hydraulic cylinder 170 so that the ears 152 on the end of the ram tube 142 pass downwardly through cutout portions 210 of electrode holder 20, and are located under the said flange 206. Then the ram tube 142 is rotated by action of motor 148 until the ears 152 are disposed below their mating cavities 208. Lifting action of hydraulic cylinder 170 will then raise the ram tube assembly until the ears 152 snugly engage cavities 208. Hydraulic cylinder 162 is then actuated to force push rod 154 downwardly with its bottom 156 in contact with the top of plate 198 to establish good electrical contact therewith and also to exert a downward thrust to ring 200 thereby to securely lock ram tube ears 152 in ring flange cavities 208.

Electrical power may be conveniently transmitted to the consumable electrode through power cable connector 212 to bus bar connecting members 132 which in turn transmit current to plate 134 through brushes 214. Since the central push rod 154 is actuated with limited movement connection may be made from the plate to its top portion by cables 216.

In operation of the furnace an electrode 196, which may have previously been formed by compacting crude metal or a mixture of metal and alloying elements, or may be a previously melted ingot which is to be remelted to improve homogeneity, is firmly attached to contact plate 198, which is fixed to the base of ring 200 by tightening bolts 202. This assembly is then placed in the furnace housing being suspended and centered by pins 52, which are run in to mate with the sockets 204 in the holding ring assembly. Due to its length, the electrode is supended by the upper set of internally projecting pins and hangs, therefore, over and partially inside a crucible 20 which has previously been positioned in its water jacket and housing. The electrode drive mechanism 14 is then swung into position by rotating the drive positioning mechanism 16 and is lowered on the furnace unit by action of hydraulic cylinder 180. Gasket 116 being previously in place, flange 118 meets properly with flange 114 and bolts 120 are snugly tightened to close up the furnace. Ram tube 142 is then lowered by action of hydraulic cylinder 170, with the ears 152 at the bottom of ram tube 142 passing through and below the radial openings 210. The ram tube is then rotated by means of motor 148 to bring the ears 152 below cavities 208 in the under surface of ring flange 206. The push rod 154 is then activated downwardly by hydraulic cylinder 162 forcing the ears 152 against the under surfaces of cavities 208 and thereby locking the ring assembly and the suspended electrode securely to the ram actuating mechanism. The interior of the furnace is then evacuated or charged with inert gas through pipe 66 if such condition is necessary or desirable during the melting operation. Cooling fluid is circulated through water jackets to protect various parts from over-heating as will be evident. Power is then applied to initiate the arc and melting, connections being made to the crucible 20 through connector 50 and to the electrode through the drive mechanism and connector 212.

Vertical overall movement of the electrode with respect to the crucible or molten metal contained therein is obtained, as will be apparent, from the action of upper hydraulic cylinder 170. The hydraulic lines from this cylinder are connected to conventional hydraulic pressure producing means and valves, as will be apparent to those skilled in the art. The pressure producing means will be controlled by suitable apparatus so that the required arc melting conditions are maintained in the furnace. This may advantageously be arranged so that a constant arc voltage is maintained between the bottom of the electrode and the molten metal in the crucible, and known electrical devices may be employed to actuate the hydraulic pressure producing means to maintain such conditions. Such control methods and apparatus are well known and in and of themselves form no part of this invention. Under these conditions, since the length of the arc is related to the voltage, a more or less constant distance may be maintained between the bottom of the electrode and the molten pool of metal in the crucible and as the electrode becomes gradually consumed and formed into ingot metal in the crucible the electrode will move automatically to maintain melting conditions. When the electrode has been consumed to the point where proximity of the arc to the electrode attachment plate 198 makes further melting undesirable the current is shut off. Cylinder 170 is then actuated to locate the ring 200 with its attached electrode stub in position so that sockets 204 are aligned with the lower set of pins 52. These are then run into their corresponding sockets to suspend the stub in the cooling throat of the furnace structure. Push rod 154 is then moved upwardly to unlock ram tube 142, which is lowered and rotated so that it may then be raised clear of the now suspended electrode stub, and into that section of the furnace above flange 70. Flap gate 74, being vertical and spaced below the top of the furnace to allow room for the bottom attachments of the ram tube at this time, may then be actuated to securely close port 72 by suitable rotation of hand wheel 108. Port 72 seals the furnace unit which now contains the suspended stub and the ingot which has been melted and these remain in the furnace unit, protected from atmospheric contamination, until sufficiently cool so that they may be exposed to the atmosphere without damage. This cooling may be carried out under vacuum; preferably a non-contaminating gas is introduced to provide somewhat more rapid heat transfer.

With the stub and electrode now arranged for cooling in the particular furnace unit employed, the drive positioning mechanism 16 is operated to transfer the electrode drive mechanism 14 into position for operative engagement with another furnace unit. This is accomplished by removing bolts 120 and lifting up drive mechanism 14 by action of hydraulic cylinder 180 and swinging it clear of the furnace unit used and into position for a repeat cycle of the above described procedure of operations employing another furnace unit.

The furnace of this invention is efficient and may be rapidly operated. Provision of the means described for maintaining a melted ingot and an electrode stub in a furnace unit while cooling, at the same time releasing the drive mechanism for use with another furnace unit provides rapid operation and efficient utilization of the drive mechanism and the furnace components.

We claim:

1. In arc melting apparatus, the combination of a plurality of furnace units each adapted to contain a cooled crucible, and means for releasably suspending an electrode holder therein, an electrode drive mechanism detachably mountable on each of said furnace units and including a ram detachably lockable to an electrode holder suspended in a furnace unit, means for sealing said furnace units during period of detachments of said electrode drive mechanism therefrom and means for positioning said electrode drive mechanism in mounted operative engagement selectively with any of said furnace units.

2. In arc melting apparatus, the combination of a furnace unit adapted to contain a cooled crucible, means for releasably suspending an electrode holder in said furnace unit, an electrode drive mechanism detachably mountable in operative engagement with said furnace unit and including a ram detachably lockable to an electrode holder suspended in said furnace unit, and means for sealing said furnace unit during periods of detachment of said drive mechanism therefrom.

3. In arc melting apparatus, the combination of a furnace unit adapted to contain a cooled crucible, a series of pins projecting inwardly and adjustably through the wall of said furnace unit for releasably suspending an electrode holder in said furnace unit, an electrode drive mechanism detachably mountable in operative engagement with said furnace unit and including a ram detachably lockable to an electrode holder suspended in said furnace unit and means for sealing said furnace unit during periods of detachment of said drive mechanism.

4. In arc melting apparatus, the combination of a furnace unit adapted to contain a cooled crucible, means for releasably suspending an electrode holder in said crucible, an electrode drive mechanism detachably mountable in operative engagement with said furnace unit and including a tubular ram having ears at its bottom adapted to engage corresponding cavities on the under side of an inturned electrode holder flange, a push rod disposed in said ram tube and adapted, by downward actuation with respect to said ram tube, to force the ears on the bottom of said ram tube to lock in the cavities in the flange of an electrode holder suspended in said furnace unit, and means for sealing said furnace unit during periods of detachment of said drive mechanism therefrom.

5. In arc melting apparatus, the combination of a furnace unit adapted to contain a cooled crucible, and means for releasably suspending an electrode holder in said crucible, an electrode drive mechanism detachably mountable in operative engagement with said furnace unit and including a ram detachably lockable to an electrode holder suspended in said furnace unit, and means including a horizontal flap gate spaced below the top of said furnace unit, and means for sealing said furnace unit during periods of detachment of said drive mechanism therefrom.

References Cited in the file of this patent

UNITED STATES PATENTS

| | | | |
|---|---|---|---|
| 1,610,809 | Newman | Dec. 14, | 1926 |
| 2,640,860 | Herres | June 2, | 1953 |
| 2,651,668 | Southern | Sept. 8, | 1953 |
| 2,759,034 | Southern | Aug. 14, | 1956 |